Figure 1:
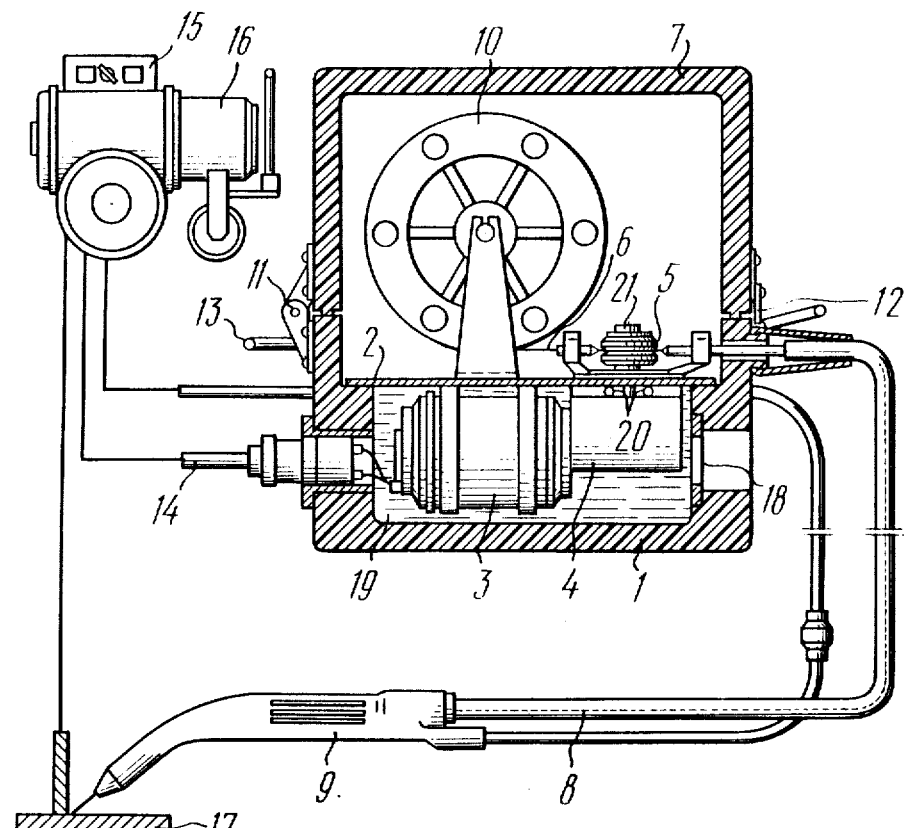

United States Patent
Paton et al.

[11] 3,892,937
[45] July 1, 1975

[54] APPARATUS FOR UNDERWATER WELDING OF METAL STRUCTURES

[76] Inventors: Vladimir Evgenievich Paton, ulitsa Anri Barbjusa, 22/26, kv. 61; Vladimir Borisovich Smolyarko, ulitsa Artema, 26a, kr. 3; Mikhail Gdal Gershovich Belfor, pereulok Ivana Maryanenko, 11/12, kv. 28; Vladimir Grigorievich Pichak, ulitsa Lenina, 88–92, kv.59; Igor Mavrikievich Savich, ulitsa Vernadskogo, 85, kv. 86; Alexandr Grigorievich Rybchenkov, ulitsa Filatova, 1/22, kv. 61; Vasily Ivanovich Pankov, ulitsa Prazhskaya, 3, kv. 114; Arkady Anatolievich Ignatushenko, ulitsa Kapitanovskaya, 20, kv. 1, all of Kiev, U.S.S.R.

[22] Filed: Dec. 14, 1973

[21] Appl. No.: 424,833

[30] Foreign Application Priority Data
Dec. 19, 1972 U.S.S.R. .............................. 1859980

[52] U.S. Cl. ................... 219/72; 174/12 R; 219/74; 219/101
[51] Int. Cl. ............................................ B23k 35/38
[58] Field of Search..... 174/12 R; 219/57, 59, 60 R, 219/60 A, 72, 74, 101

[56] References Cited
UNITED STATES PATENTS

| | | | |
|---|---|---|---|
| 3,632,950 | 1/1972 | Berghof | 219/72 |
| 3,670,276 | 6/1972 | Theodore | 174/12 R X |
| 3,750,088 | 7/1973 | Berian | 174/12 R X |
| 3,787,655 | 1/1974 | Anderson et al. | 219/72 |
| 3,794,804 | 2/1974 | Berghof | 219/72 X |

*Primary Examiner*—J. V. Truhe
*Assistant Examiner*—N. D. Herkamp

[57] ABSTRACT

Apparatus for the underwater welding of metal structures comprising a hermetically sealed housing wherein are accommodated an electric motor and a reducing gear immersed in a lubricant which is dielectric material. In the housing there is provided a built-in membrane for transmitting the pressure of the environment onto the lubricant contained in the housing chamber so as to improve its hermetic sealing. A coil and rollers for winding an electrode wire and for feeding it into a flexible hose are arranged in an enclosure also made of a dielectric material. Means for electric motor control and a power supply source for the motor are situated outside the housing and the enclosure of the apparatus, being connected therewith via a chain of electric wires or cables.

12 Claims, 2 Drawing Figures

APPARATUS FOR UNDERWATER WELDING OF METAL STRUCTURES

The invention relates to apparatus for underwater welding of metal structures at depths accessible for divers.

At present, underwater welding of metal structures is accomplished manually. In this case, hermetically sealed means, e.g. electrode holders are used which have the form of acrylic hoods or cells enclosing the metal structure area being welded. Air or gas is supplied under pressure into the hood or cell and displaces the surrounding water from the welding zone.

Hoods have but a limited use, preferably under laboratory conditions, whereas cells are cumbersome. The manufacture, erection and dismounting of cells are all very time-consuming operations.

The hoods and cells relate to expensive equipment, and to perform a welding job under such conditions, highly skilled welders-divers are required who have to stay under water for a long time since the devices used by them do not provide high productivity of the underwater welding operations.

In addition, the aforementioned devices are impracticable for welding large-size or spacious metal structures.

For welding parts of floating ship hulls, semielastic caissons are employed but they are suitable only for making a limited number of welds.

Underwater welding of metal structures involves some difficulties when, for instance, parts of a metal structure being welded are arranged vertically or over the welder (overhead welding).

In view of the facts set forth, the productivity of welding procedures and the quality of welded joints achieved at present do not meet the ever-increasing requirements.

Attempts have been made to mechanize manual operations in the underwater welding of metal structures. A device for semi-automatic welding developed as a result of these, had a housing accommodating an electric motor with a reducing gear, an electrode wire feeder and a coil with electrode wire wound thereon. The housing was connected by a hose to a compressed gas or air supply source. Gas or air was supplied into the housing chamber under pressure exceeding the hydrostatic pressure and preventing water leakage to the electric motor, the gas or air being discharged through a flexible hose with a burner.

In testing this device an unforeseen difficulty was noted. The stream of gas bubbles emerging from the burner and generating steam shielded the welded joint area from the welder's sight thus deteriorating the visibility of the welding process performed by him. This device has found no practical application.

A number of devices developed previously had some or other shortcomings including: a complicated design, the impossibility of servicing and reloading the welding unit under water, the necessity to increase the gas pressure as the unit was being immersed, the difficulty to provide dependable electrical insulation which resulted in electrical energy losses in the seawater.

Some devices operate well in fresh water. In seawater, however, a portion of the electrical energy is supplied to the work being welded, namely by metal parts through the seawater, thus by-passing the welding arc. This results in considerable losses of electrical energy and electrolytic erosion of the metal parts.

The creation of a reliably operating apparatus for underwater welding of metal structures is necessary in connection with the development of natural resources of the ocean and, first of all, those of the continental shelf as well, as the construction and repair of large-tonnage ships, port structures, pipelines for various purposes, sea footings, e.g. for drilling installations, and elevated trestles of oil fields.

As before, difficulties are encountered due to unsolved problems of increasing productivity of underwater welding procedures, improving the weld quality and making it possible for divers to perform such procedures after a short period of training.

The principal object of the present invention is to provide an apparatus for the underwater welding of metal structures which makes it possible to obtain welded joints whose mechanical properties (ultimate tensile strength, yield strength, elongation, reduction of area, toughness and angle of bending) are similar to those of metals being welded under average conditions.

Another not less important object of the present invention is to provide an apparatus adapted for operation under water at considerable depths and ensuring an increase in productivity of welding procedures.

Another object of the present invention is also to improve the apparatus life and facilitate its maintenance.

Still another object of the invention is to prevent the destroying effect of the electric current upon the apparatus parts and reduce electrical energy losses.

The above-mentioned and other objects of the invention are attained by providing an apparatus for the underwater welding of metal structures, comprising a housing with a cover which form a chamber in which is installed an electric motor with a reducing gear, kinematically connected to electrode-wire feed rollers, the wire being wound on a coil and being fed through a flexible hose to a burner. The apparatus also has means, outside the housing, for electric motor control and a power supply source electrically connected to the electrode wire and the metal structure being welded.

According to the invention the housing chamber that accommodates the electric motor with the reducing gear is adapted to be filled with a lubricant possessing the properties of a dielectric material. The housing has a built-in device e.g. a membrane, for transmitting the pressure of the environment onto the lubricant, and gaskets hermetically sealing said chamber and provided at the outlet of the reducing gear shaft, at points of mounting the device, connecting the power supply to the electric motor and also at the joint of the housing with the cover. Finally there is in the apparatus an enclosure linked with the housing and also made of a material with dielectric properties, wherein the coil and the electrode-wire feed rollers are housed.

In the inventive apparatus there is no need for an air or gas supply in the housing chamber and, therefore, the formation of a stream of air or gas bubbles in the electric arc zone is avoided.

The hermetic sealing of the housing chamber with the electric motor and the reducing gear located therein prevents these from an inadmissible contact with the water whereas the lubricant with dielectric properties filling the housing chamber has a favourable effect on the reducing gear performance and does not interfere with the electric motor operation.

The device or membrane built into the apparatus housing transmits the environmental pressure onto the lubricant contained in the housing chamber, thereby precluding water leakage into the housing chamber through the gaskets mounted on the reducer gear shaft that extends from the housing into the enclosure interior.

The enclosure made of a dielectric material contributes to improving the life of the wire rollers and reduces electrical energy losses. In addition, the enclosure protects the apparatus parts from electrolytic erosion.

The enclosure is linked with the housing as a cover, and therefore it is convenient for inspection and maintenance.

The apparatus can be easily operated by a welder-diver of average skill.

It is preferable to mount the membrane, constituting the pressure transmitting device, in apparatus used for submerging into water to a depth up to 100 meters. It can be made of rubber, foil or some other elastic material. The device may also be in the form of a so-called "sylphon", that is a corrugated sleeve of stainless steel, brass and the like, an undulated pipe, or a bellows.

Apparatus fitted with such sylphons can be employed for operation at depths exceeding 100 m since they can be moved to a greater distance as compared to apparatus with conventional membranes.

Used as a fluid filling for the housing chamber polyethylsiloxane may be used. This water-repellent silicon fluid is a good lubricant for the reducing gear parts and produces no adverse effects on the electric motor operation.

It is also possible to use a mixture of ethyl or methyl alcohol with castor oil.

This liquid mixture is cheaper than polyethylsiloxane while having the same advantageous properties as a lubricant and a dielectric material.

The apparatus enclosure can be made of foam plastic, an acrylic resin (e.g. Plexiglas), a polymeric material, foamed epoxy resin, polyamide fiber known under the United States Trademark of Caprolan or polyethylene.

Each of the aforementioned materials possesses dielectric properties and can protect the metal parts of the apparatus from electrolytic erosion.

It is preferable that the apparatus enclosure be designed with a portion surrounding the apparatus housing from the outside. Such design of the apparatus ensures a more reliable protection of its parts from the action of the electric current.

Figure 2:
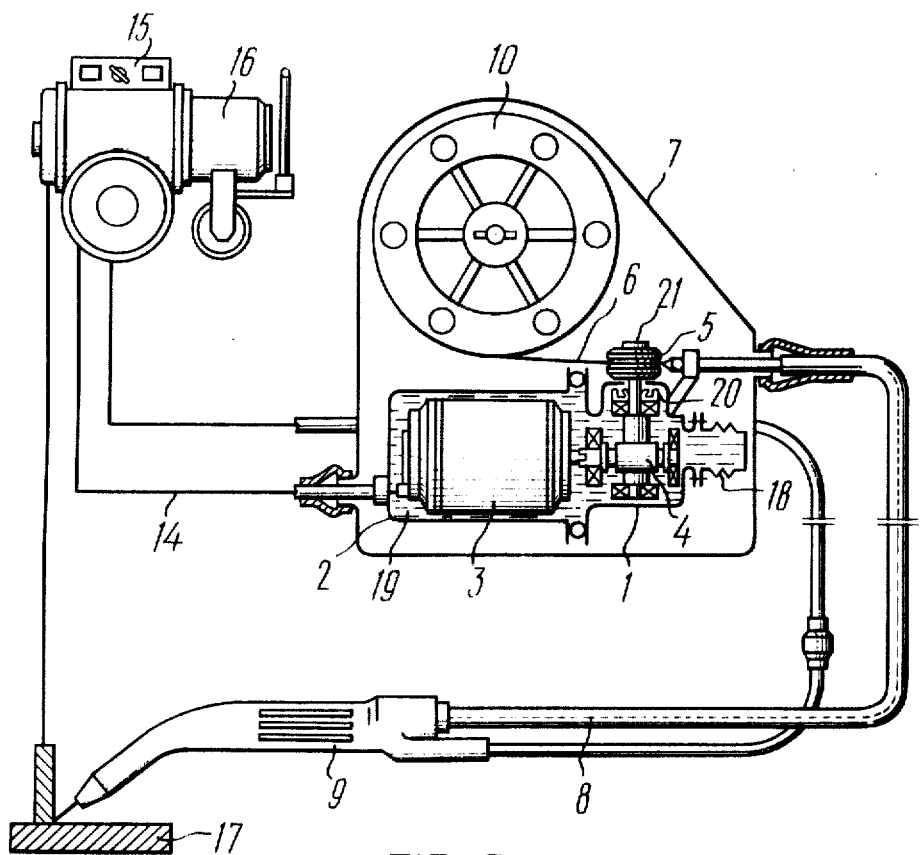

The invention will be hereinafter described by way of example and with reference to the accompanying drawings in which:

FIG. 1 illustrates an inventive apparatus wherein an enclosure is linked with a housing, with a cut-away partial side view of the part to be immersed into the water; and FIG. 2 is a modified embodiment of an apparatus wherein an enclosure has a portion surrounding the housing from the outside, including a cut-away side view of the apparatus part to be immersed into the water.

An apparatus for underwater welding of metal structures comprises a housing 1 (FIG. 1) with a cover 2 forming a hollow chamber wherein is installed an electric motor 3 with a reducing gear 4 kinematically connected to rollers 5, arranged over the cover 2, for feeding an electrode wire 6 of an enclosure 7 into a flexible hose 8 having a burner 9.

The electrode wire 6 is wound on a coil 10 mounted above the cover 2 of the housing 10 and protected by the enclosure 7, linked with the housing by means of a hinge 11 and a locking catch 12.

The above equipment represents a container with handles 13, immersed into the water and connected by electric wires 14 with means 15 located above the water for controlling the electric motor 3, means containing on-off controls and measuring instrumentation, and with a power supply source 15 electrically connected with the electrode wire 6 where the burner 9 is located, and to the metal structure 17 being welded.

In the chamber of the housing 1, only the electric motor 3 with the reducing gear 4 is installed. A device 18 is built into the wall of the housing 1, transmitting the pressure of the environment onto a fluid 19 filling up the housing chamber and being a lubricant having the properties of a dielectric material.

The hollow chamber of the housing 1 is hermetically sealed with gaskets 20 mounted at the outlet of a shaft 21 of the reducing gear 4, at the points of mounting the device 18, connecting the power supply to the electric motor 3, and at the joint of the housing 1 with the cover 2.

Polyethylsiloxane or another silicone liquid and also a mixture of ethyl or methyl alcohol with castor oil may be used as the fluid 19 for filling up the chamber of the housing 1.

To improve the performance of the gaskets 20 hermetically sealing the chamber of the housing 1, devices are employed for transmitting the environmental pressure onto the fluid contained in the housing, such as conventional membranes if the welding procedures are carried out at a depth up to 100 m, or the device 18 (FIG. 2) if operations are performed at a depth exceeding 100 m. A membrane can be made of foil, rubber or some other elastic material.

For the manufacture of the enclosure 7, materials as foam plastic, plexiglas, a polyamide fiber, polyethylene, foamed epoxy resin, polymers, glass-fibre plastic and reinforced rubber can be used.

The apparatus parts will be better protected from electrolytic erosion if the enclosure 7 (FIG. 2) is provided with a portion surrounding the housing 1 from the outside. In this case, there occurs some water leakage into the enclosure 7 through a hole in the burner 9 but it presents no danger for the coil 1 with the electrode wire 6, whereas the electric motor 3 with the reducing gear 4 is enclosed in the hermetically sealed housing 1.

The apparatus operates as follows. Prior to the beginning of the welding procedures some preliminary work is to be carried out. The power supply source 16 is connected by the electric cables 14 to the metal structure 17 to be welded and to the electrode wire 6 at the location of the burner 9 coupled by means of the flexible hose 8 with the enclosure 7 and the housing 1, both being submerged into the water. The control means 15 is connected by the multicore cables 14 and by watertight couplings (not shown in the drawings) to the electric motor 3.

In the enclosure 7 is installed the coil 10 with the electrode wire 6 whose end is entered in the flexible hose 8 so that it projects out of the burner 9 and comes into contact with leads located therein. The feed rollers 5 are brought together so that they grip the electrode wire 6 and provide its winding off the coil 10.

Upon completion of the preliminary operations, the container is immersed into the water at a preset depth and a welder-diver takes the burner 9 into his hands, places himself in a position where the welding operations are to be conducted, and sends a command to the surface to supply the electric current. At the diver's command, an operator turns on the welding current and provides power supply for the electric motor 3. The reducing gear reduces the number of revolutions transmitted by the electric motor 3 and sets in motion the rollers 5 that feed the wire 6. The electrode wire being wound off the coil 10 is pushed into the flexible hose 8 towards the burner 9 under the action of the rollers 5.

The end of the electrode wire 6 projecting from the burner 9 comes into contact with the metal structure 17 being welded, and the high current densities and the electrical resistance encountered at the point of their contact result in developing very high temperatures and in the striking of an electric arc. Thus, the electrode wire 6 is melted and the metal structure 17 is fused off in the weld zone. Continuous uniform feeding of the electrode wire 6 ensures improved productivity and obtaining a high-quality welded joint.

The apparatus provides free access for inspection and maintenance, its parts are protected from electrolytic erosion, and there is no need of an air or gas supply, as a result of which the welder can better see the performed welding procedure.

The apparatus is adapted for work at considerable depths as far as accessible by the diver and also to weld metal structures of various shapes and dimensions.

Tests have proved that the apparatus is reliable in operation and has improved the productivity at welding speeds up to 6–8 m/hr.

The inventive apparatus has been implemented for the underwater welding of metal structures situated in various spatial attitudes, and pressure-tight strength welds have been obtained.

What we claim is:

1. An apparatus for the underwater welding of metal structures, comprising: a motor and gear housing with a removable cover, defining therein a chamber filled up with a lubricant having dielectric properties; said cover having a through opening, a joint between said housing and said cover; an electric motor installed in said chamber; a reducing gear kinematically connected with said motor, also installed in said chamber and having a shaft the outer end of which extends via said opening; a device built into said housing, for transmitting the pressure of the environment onto the lubricant in said chamber; a wire enclosure made of a material also having dielectric properties; a coil and the like on the outside of said cover, for an electrode wire wound on said coil; wire feed rollers also located on said cover for gripping the wire and winding it off said coil, said rollers being kinematically connected to said outer shaft end; said enclosure at least partly surrounding said cover, said coil and said rollers; a flexible hose whose one end is fixed in said housing whereas the other, remote end carries a burner; means for hermetically sealing said chamber and said cover, said sealing means being provided at said opening for the shaft, at the point of mounting said transmitting device; a power supply for said motor, also disposed at said joint, means for controlling said motor, arranged outside said housing and electrically connected to said motor; and a power source with poles electrically connected to the wire and to a metal structure being welded.

2. The apparatus as defined in claim 1, wherein said transmitting device is a membrane built into a wall of said housing.

3. The apparatus as defined in claim 1, wherein said transmitting device is a so-called sylphon, that is a member in the form of a corrugated sleeve.

4. The apparatus as defined in claim 1, wherein polyethylsiloxane is used as the lubricant.

5. The apparatus as defined in claim 1, wherein a mixture of ethyl alcohol and castor oil is used as the lubricant.

6. The apparatus as defined in claim 1, wherein at least one of the dielectric materials is a polymer.

7. The apparatus as defined in claim 1, wherein at least one of the dielectric materials is a foamed resin.

8. The apparatus as defined in claim 7, wherein the foamed resin is a foamed epoxy resin.

9. The apparatus as defined in claim 1, wherein at least one of the dielectric materials is a polyamide fiber.

10. The apparatus as defined in claim 1, wherein at least one of the dielectric materials is an acrylic resin.

11. The apparatus as defined in claim 1, wherein at least one of the dielectric materials is polyethylene.

12. The apparatus as defined in claim 1, wherein said enclosure has a portion surrounding said housing from the outside.

* * * * *